United States Patent [19]

McCambridge

[11] Patent Number: 4,977,559
[45] Date of Patent: Dec. 11, 1990

[54] IMPROPER BIT COMBINATION DETECTION CIRCUIT

[75] Inventor: John M. McCambridge, Northville, Mich.

[73] Assignee: Chrysler Corporation, Highland Park, Mich.

[21] Appl. No.: 286,195

[22] Filed: Dec. 19, 1988

[51] Int. Cl.⁵ .............................................. G06F 11/00
[52] U.S. Cl. ................................ 371/57.1; 364/431.04
[58] Field of Search ............................. 371/57.1, 57.2; 364/431.04, 431.11

[56] References Cited

U.S. PATENT DOCUMENTS

| | | | |
|---|---|---|---|
| 4,059,749 | 11/1977 | Feilchenfeld | 371/57.1 |
| 4,312,071 | 1/1982 | Bloch | 371/57.1 |
| 4,835,776 | 5/1989 | Annamalai | 371/57.1 |

Primary Examiner—Charles E. Atkinson
Attorney, Agent, or Firm—Wendell K. Fredericks

[57] ABSTRACT

Combinational logic circuits are used with a temporary storage device holding data bytes to detect improper bits in both the lower and upper nibbles of the bytes. Combinations of bit patterns derived from both nibbles permit flagging the occurrences of a variety of bit errors existing in sequentially transmitted parallel data bytes.

3 Claims, 3 Drawing Sheets

IMPROPER BIT COMBINATION DETECTION CIRCUIT

BACKGROUND OF THE INVENTION

1. Field of the Invention

The present invention relates generally to improper bit combination detection circuits and, in particular, to circuits in an asynchronous data reception device for flagging the occurrence of a variety of bit errors in sequentially transmitted parallel data bytes.

2. Prior Art

Copending patent application Ser. No. 07/286,196 of the present inventor filed Dec. 19, 1988 provides a Power-Up Synchronization circuit for synchronizing parallel transferred data words to the timing within a data reception device. The present invention as taught herein may be used in cooperaton with the structure claimed in U.S. Pat. No. 4,885,583 dated Dec. 5, 1989 of John McCambridge entitled "Serial to Parallel Data Conversion System".

In bus data transmission systems, where a transmitter sends messages over a bus to multiple receivers connected to the bus, normally the basic elements of a communication protocol exist. Usually there exist a set of symbols or character sets, a set of rules for the sequence and timing of messages constructed from the character set and procedures for determining when an error has occurred in the transmission and how to correct the error. The character set usually consists of a subset which is meaningful to the parties communicating (printing character - name) and another subset which conveys control information meaningful to the processing equipment (control characters - symbol). A correspondence exists between the name and the symbol; e.g., the name "fuel" corresponds to code 0000, "speed" corresponds to the code 0110. The set of rules followed by the sender and receiver gives the meaning, permissible sequence, and time relationships of the printing names and the control symbols. The error detection and correction procedures allows for the detection of orderly recovery from errors caused by factors outside the control of the sending and receiving devices.

For asynchronous data, encoded symbols for the start and stop of a message provides control for synchronizing receipt to the transmission of the data.

For the purpose of error detection, an added encoded parity symbol to the transmitted message permits the receiver to provide an indication to the sender of the occurrences of uneven parities.

Another technique, where the receiver echoes symbols back to the sender, provides another form of protocol that lets the sender know if the correct data reaches the receiver.

Still another technique, checksums, provide a measure of confidences in the transmitted messages. There, a binary addition technique achieves a redundancy check of symbols of the message for detecting single and multiple bit errors usually in synchronous systems.

A problem exists in data reception devices having no special timing signal (asynchronous systems) adapted to function with synchronous systems for detecting improper bits. A search for various schemes for detecting improper bits in stand alone data reception devices was initiated. The search resulted in the improper bit detection circuit of the present invention.

BRIEF SUMMARY OF THE INVENTION

The present invention concerns a novel improper bit combination detection circuit for detecting directly the improper bits in both the lower and upper nibbles of a byte in an asynchronous system. Combination logic circuits are used to respond almost immediately to outputs of storage registers in developing error signals that indicate errors in both the upper and lower nibbles. Bit states of the lower and upper bits are combined in combination logic circuits in patterns that force improper bit combinations to surface.

BRIEF DESCRIPTION OF THE DRAWINGS FIGURES

DETAILED DESCRIPTION OF A PREFERRED EMBODIMENT

Figure 1:
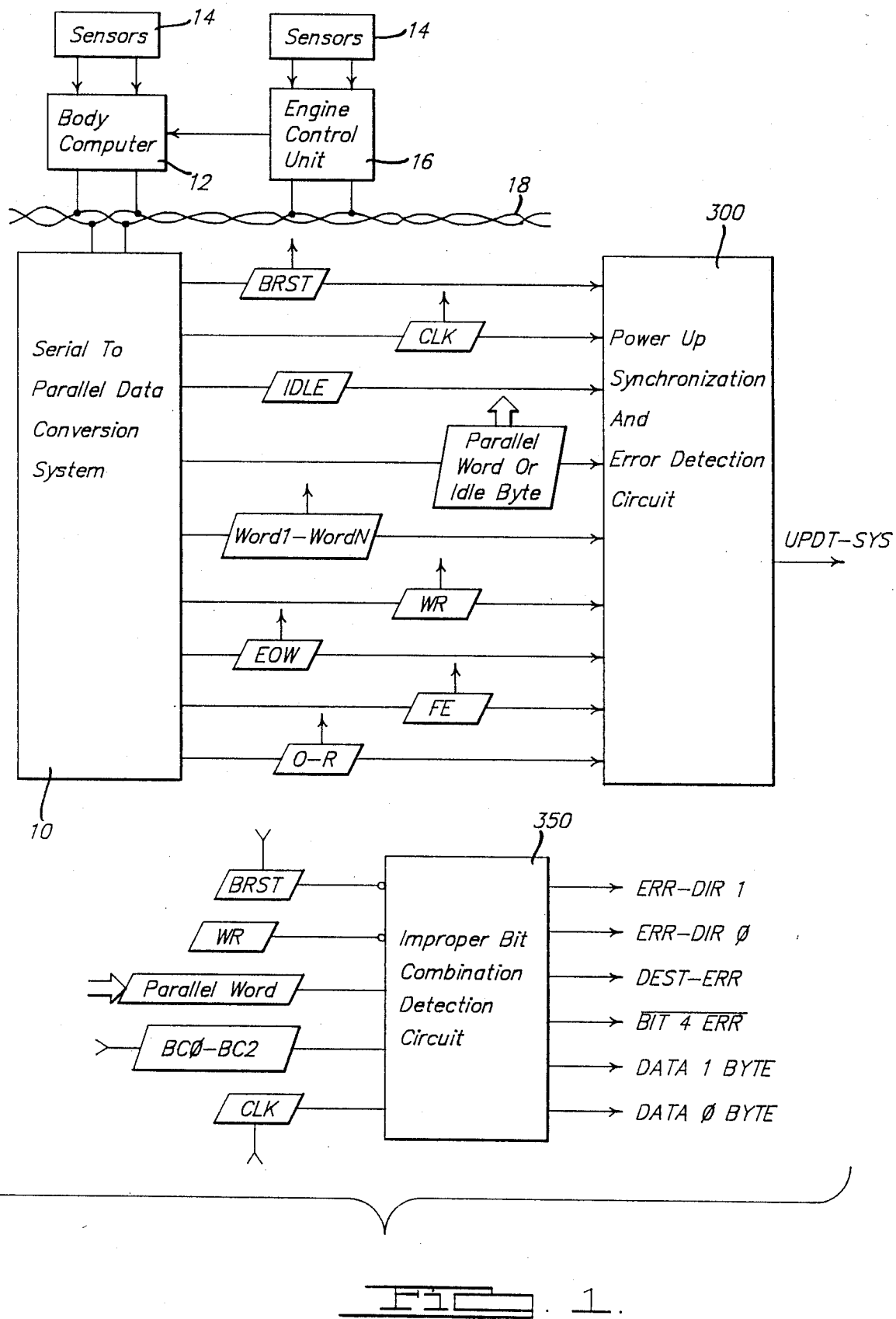
FIG. 1 illustrates, connected to a data link and transmitter, a data reception device containing an improper bit combination detection circuit of this invention.

Referring now to FIG. 1, where an illustration depicts a data reception device in a communication system containing an improper bit combination detection circuit. The data reception device includes a serial to parallel data conversion system 10 a power-up synchronization and error detection circuit 300 and the improper bit combination detection circuit 350.

A body computer 12 acts as a transmitter for transmitting serial data to system 10 of the receiver over data link 18. Analog sensors 14—14 provide analog signals concerning, illustratively, a variety of parameters that depict operational and physical conditions of a motor vehicle to at least two different computing devices, namely, the body computer 12 and an engine control unit 16. These two computing devices convert the analog sensor signals into corresponding digital signals. The body computer 12 essentially consolidates the converted digital sensor data and forms serial messages describing the sensed data and then broadcast the sensor messages over link 18 to multiple transceivers and data reception devices connected to link 18.

Serial to parallel data conversion system 10 converts the serial sensor messages into parallel byte words and at the same time scrutinize the bits of serially received data for framing errors and over-range voltage levels of each bit due to noise on the link.

The power-up synchronization and error detection circuit 300 tries to synchronize the receipt of a three-byte message packet format.

Figure 2:
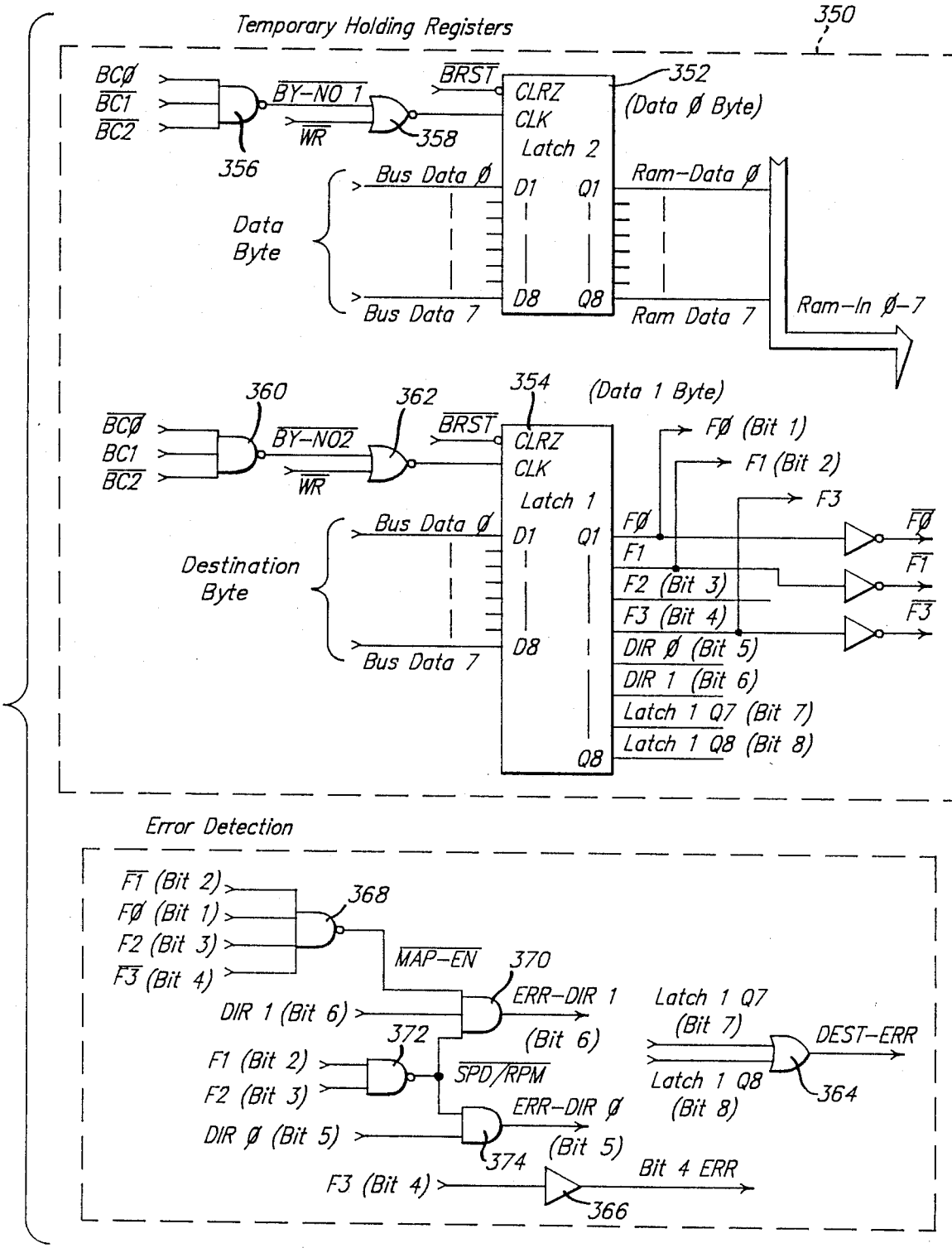
FIG. 2 illustrates the combination logic circuits of the improper bit combination detection circuit.

After the power-up synchronization and error detection circuit 300 of FIG. 1 generates an UPDT-SYS signal, using the 1st byte, the ID byte of the tree byte message, the Improper Bit Combination Detection circuit 350 loads the other two bytes, the DATA 0 (the data codes) and DATA 1 (the destination codes) bytes in temporary holding registers 352 and 354 of FIG. 2, latch 2 and latch 1, respectively.

The WR or write signal from the Serial to Parallel conversion circuit 10 of FIG. 1 results after the first 10 data bits (the ID byte) of the message enter the Power Up Synchronization and Error Detection circuit 300 of FIG. 1 where a match between a hardwired ID code and the ID byte occurs. Hence, a counter in circuit 10 which counts the occurrences of WR signal does not get the opportunity to count the WR signal until after processing the ID byte. Therefore, the BC0 (byte count zero) generated within system 10 represents the ID byte of the message transmitted over link 18.

Hence, the binary 1 byte count (BC0, $\overline{BC1}$, $\overline{BC2}$) necessary to load the second byte, the data code, into register 352 of FIG. 2 goes to NAND gate 356 to form the low $\overline{BY\text{-}NO1}$ signal. The low $\overline{BY\text{-}NO1}$ signal along with a low $\overline{WR}$ enables NOR gate 358 to generate a clock signal for clocking the parallel data 0 byte into register 352. Likewise, the binary 2 byte count ($\overline{BC0}$, BC1, $\overline{BC2}$) necessary to load the third byte, the designation code, into register 354 goes to NAND gate 360 to form the low $\overline{BY\text{-}NO2}$ signal. The low $\overline{BY\text{-}NO2}$ signal, along with the low $\overline{WR}$ signal enables NOR gate 362 to generate the clock signal for clocking the parallel data 1 byte into register 354.

IMPROPER BIT DETECTION

With DATA 1 in register 354, system 350 performs bit checks of each stored word to ensure proper bit patterns. DATA 1 consist of upper and lower nibbles. The lower nibble determines which function in accordance with Table 1 requires updating. The upper nibble contains four bits. The two least significant bits are for direction control for speed and RPM functions; the least significant bit is for direction control of the map function; the two most significant bits are for error detection. If not updating speed, RPM or MAP, the both least significant bits are used for error detection. The two most significant bits of the upper nibble are always used for error detection regardless of the function being processed. Combinational logic rather than a conventional error detection scheme such as check sum determines at the receiving end that the data has survived the transmission process unaltered. To do this, several different combinational logic circuits use the logic count and the bit values of each DATA 1 word of register 354 to detect alterations in the data. A high ERR-DIR0 and ERR-DIR1 along with a high DEST-ERR and BIT 4 error signals denote improper bit combination.

In this embodiment, the DATA 1 words contain, in the lower nibble, the codes for controlling indicators of the function listed in table 1.

TABLE 1

| Function | Bit 4 | Bit 3 | Bit 2 | Bit 1 |
|---|---|---|---|---|
| Fuel | 0 | 0 | 0 | 0 |
| Temp | 0 | 0 | 0 | 1 |
| Oil | 0 | 0 | 1 | 0 |
| Volt | 0 | 0 | 1 | 1 |
| Dim | 0 | 1 | 0 | 0 |
| Map | 0 | 1 | 0 | 1 |
| Speed | 0 | 1 | 1 | 0 |
| RPM | 0 | 1 | 1 | 1 |

ERR_DIR0 error signal is generated at the output of AND 374 if bit 5 of DATA1 is a one level if the output of NAND gate 372 is a 1, which can be accomplished by either or both bits 2 or 3 of DATA1 being a zero level.

ERR_DIR1 is generated at the output of AND gate 370 if the inputs to the gate are a logic one. The input bit 6, from DATA1 will obviously be a one if bit 6 is a one. Not MAP_EN, output of NAND 368 will be a one if bits 4, 3, 2, and 1 from DATA1 are a logic 1, 0, 1, and 0 respectively. The output of NAND 372 will be a one if either or both logic levels of bits 2 and 3 are a zero level.

For detecting bit 4 errors, the output of buffer 366 goes high during transmission of a improper bit 4 of DATA 1 word. However, bit 4 may go high for other functions not coded in a DATA 1 byte.

Figure 3:
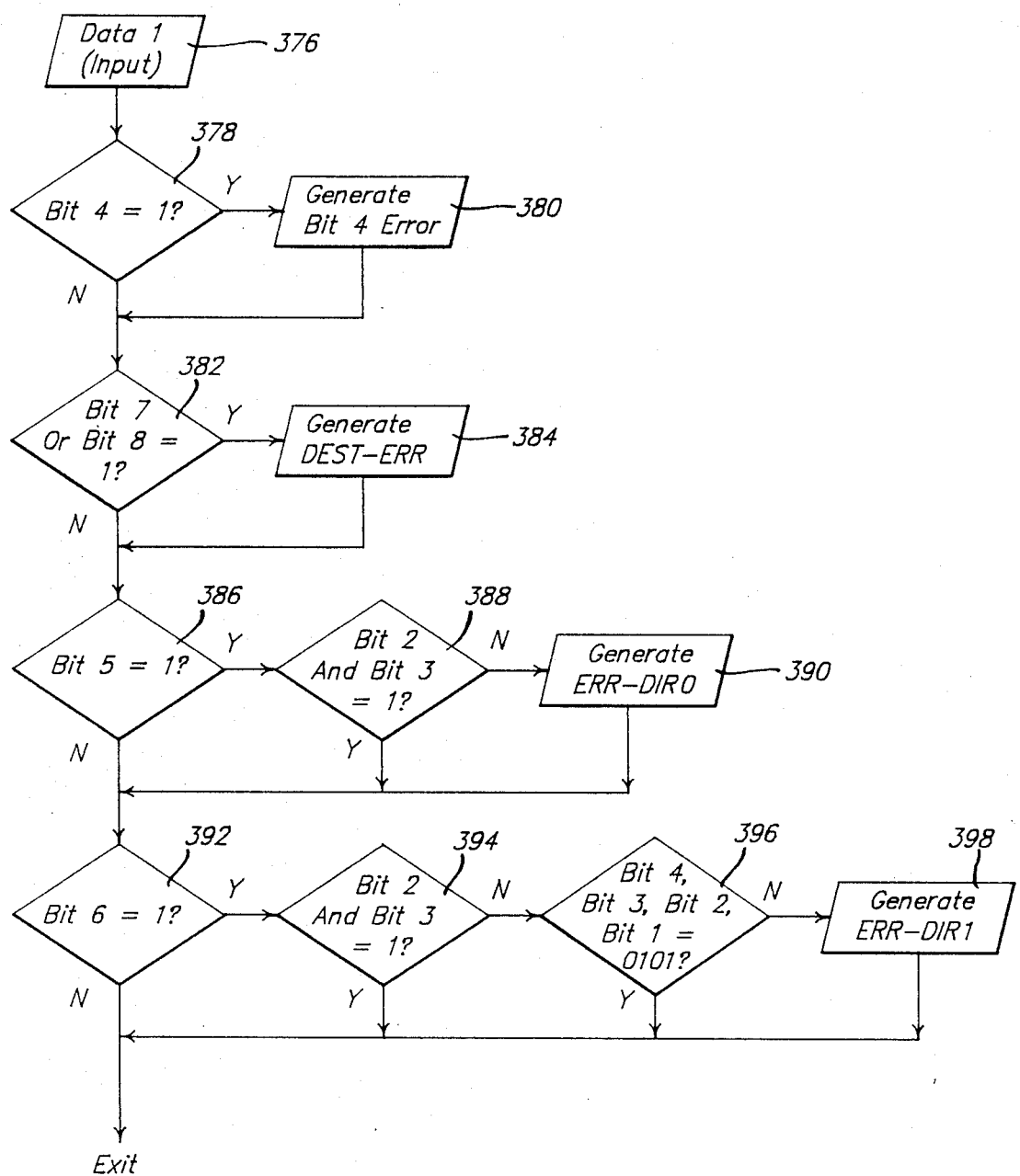
FIG. 3 illustrates a flow diagram of the operation of the improper bit combination detection circuit.

FIG. 3, a flow chart, depicts the operation of the improper bit combination detection circuit 350. From the storage register 354 output circuits combinational logic circuits scrutinize the bit patterns to detect errors in bits 4 through 8 or coincidence with the bit patterns dictated by the preassigned bit values of Table 1. In input operation block 376, data bits enter the improper bit combination circuit 350.

At decision block 378, circuit 350 determines if bit 4 is high. If so, the Y branch is taken and a bit 4 error signal is generated as indicated in output operation block 380. If not, circuit 350 then makes a decision in decision block 382 whether or not bits 7 and 8 are high. If either 7 or 8 is high, then a DEST-ERR signal in output operation block; if not, circuit 350 makes a decision in block 386 as to whether or not bit 5 is high. If bit 5 is high, then circuit 350 makes another decision as in block 388 as to whether bits 2 and 3 are high. If bit 5 is high but bits 2 or 3 are low, then an ERROR-DIR 0 signal is generated as indicated in output operation block 390. But if bits 2 and 3 are high along with bit 5, then circuit 350 decide if bit 6 is high as in decision block 392. If bit 6 is high, then circuit 350 decides whether both bits 2 and 3 are high as in decision block 394. If bits 2 and 3 are not both high, then circuit 350 decides whether bits 1 through 4 follow a 1010 pattern as in block 396. If not, then an ERROR-DIR 1 signal is generated as in output operation block 398.

TABLE 2

| Func | B1 | B2 | B3 | B4 | B5 | B6 | B7 | B8 | Error |
|---|---|---|---|---|---|---|---|---|---|
| Fuel | 0 | 0 | 0 | 1 | X | X | X | X | B 4 Error |
| Fuel | 0 | 0 | 0 | X | 1 | X | X | X | Err-Dir 0 |
| Fuel | 0 | 0 | 0 | X | X | 1 | X | X | Err-Dir 1 |
| Fuel | 0 | 0 | 0 | X | X | X | 1 | X | Dest-Err |
| Fuel | 0 | 0 | 0 | X | X | X | X | 1 | Dest-Err |
| Temp | 1 | 0 | 0 | 1 | X | X | X | X | B 4 Error |
| Temp | 1 | 0 | 0 | X | 1 | X | X | X | Err-Dir 0 |
| Temp | 1 | 0 | 0 | X | X | 1 | X | X | Err-Dir 1 |
| Temp | 1 | 0 | 0 | X | X | X | 1 | X | Dest-Err |
| Temp | 1 | 0 | 0 | X | X | X | X | 1 | Dest-Err |
| Oil | 0 | 1 | 0 | 1 | X | X | X | X | B 4 Error |
| Oil | 0 | 1 | 0 | X | 1 | X | X | X | Err-Dir 0 |
| Oil | 0 | 1 | 0 | X | X | 1 | X | X | Err-Dir 1 |
| Oil | 0 | 1 | 0 | X | X | X | 1 | X | Dest-Err |
| Oil | 0 | 1 | 0 | X | X | X | X | 1 | Dest-Err |
| Volt | 1 | 1 | 0 | 1 | X | X | X | X | B 4 Error |
| Volt | 1 | 1 | 0 | X | 1 | X | X | X | Err-Dir 0 |
| Volt | 1 | 1 | 0 | X | X | 1 | X | X | Err-Dir 1 |
| Volt | 1 | 1 | 0 | X | X | X | 1 | X | Dest-Err |
| Volt | 1 | 1 | 0 | X | X | X | X | 1 | Dest-Err |
| Dim | 0 | 0 | 1 | 1 | X | X | X | X | B 4 Error |
| Dim | 0 | 0 | 1 | X | 1 | X | X | X | Err-Dir 0 |
| Dim | 0 | 0 | 1 | X | X | 1 | X | X | Err-Dir 1 |
| Dim | 0 | 0 | 1 | X | X | X | 1 | X | Dest-Err |
| Dim | 0 | 0 | 1 | X | X | X | X | 1 | Dest-Err |
| Map | 1 | 0 | 1 | 1 | X | X | X | X | B 4 Error |
| Map | 1 | 0 | 1 | X | 1 | X | X | X | Err-Dir 0 |
| Map | 1 | 0 | 1 | X | X | X | 1 | X | Dest-Err |
| Map | 1 | 0 | 1 | X | X | X | X | 1 | Dest-Err |
| Speed | 0 | 1 | 1 | 1 | X | X | X | X | B 4 Error |
| Speed | 0 | 1 | 1 | X | X | X | 1 | X | Dest-Err |
| Speed | 0 | 1 | 1 | X | X | X | X | 1 | Dest-Err |
| RPM | 1 | 1 | 1 | 1 | X | X | X | X | B 4 Error |
| RPM | 1 | 1 | 1 | X | X | X | 1 | X | Dest-Err |
| RPM | 1 | 1 | 1 | X | X | X | X | 1 | Dest-Err |

Note that the error algorithm changes in response to the received destination symbol. If the improper bit combination detection circuit test destination symbols for functions other than MAP, SPEED or RPM, then the most the following table 2 contains examples of the eight logic variables contained in DATA 1 words that circuit 350 and the errors detected for improper bit combinations. In table 2, the letter "B" denotes "bit" and the letter "X" denotes a don't care what logic level appears for that bit. Significant lower nibble bit (bit 4) and all the upper nibble bits (bits 5,6,7 and 8) are used for error detection. If the function MAP is being tested for errors, then bits 4,5,7 and 8 are used for error detection. When the destination symbol is MAP, then bit 6 is used for providing DIRECTION 1 information (DIR 1 information, i.e., a signal that indicates activating a signal that causes; e.g., a needle or pointer to move in one direction). When the destination symbol is either SPEED or RPM, then only bits 4,7 and 8 are used for error detection. When the destination symbol is either SPEED or RPM, then bits 5 and 6 are used for providing DIRECTION 1 and 0, i.e., DIR 1 information in a first direction and DIR 0 information in a direction directly opposite to DIR 1.

What is claimed is:

1. An adaptive improper bit detection apparatus for detecting patterns of improper bit combinations of a plurality of parallel bytes representing system functions that are asynchronously updated, said bytes being stored temporarily in storage registers of said apparatus, a first byte entering aschychronously into said detection apparatus as parallel function data representing magnitude information followed by an accompanying second byte representing destination and direction information, the destination information being provided in a lower nibble that contain logic variables that indicate a symbol of the function being received, and the direction information being provided in an upper nibble that contain variables that indicate a direction for routing the function data information contained in the first byte, said function and destination information being sent to said detection apparatus as often as the function needs updating, said detection apparatus examining each lower nibble to determine whether a conjunction of the bit values of the lower nibble represent a proper symbol for accompanying the function data word, wherein certain upper nibble bits of the function destination byte are used in combination with bits of the lower nibble of the function destination byte for determining the proper bit combination of the symbol, said system comprising:

(a) first logic means having input terminals for receiving each lower nibble binary variable of the destination word that designates the function symbol being processed and producing therefrom at an output, a first enabling conjunctive signal representing a product of the lower nibble variables, said first logic means producing a disabling output signal if the product of the lower nibble variable equals the product of the variables of a first chosen function symbol of the plurality of symbols;

(b) second logic means adapted to receive at input terminals each second and third position variable of each symbol and producing therefrom at an output terminal, a second enabling conjunctive signal representing the sum of an inverse second and third variable, said second logic means producing a disabling output signal if the sum of the inverse second and third variable equals the sum of the inverse second and third variables of a second chosen function symbol;

(c) third logic means adapted to receive at input terminals said first enabling conjunctive signal, said second enabling conjunctive signal and a next-to-least significant variable of said upper nibble and producing therefrom at an output terminal a third enabling conjunctive signal representing a first error signal if the product of said first and second enabling conjunctive signals and said next-to-least significant variable of said upper nibble causes an enabling signal at the output terminal of said third logic means, said third logic means producing a disabling output signal if the product of the conjunctive input signals and the upper nibble variable causes a disabling signal to appear at the output terminal of said third logic means;

(d) forth logic means adapted to receive simultaneously at input terminals said second enabling conjunctive signal and a least significant variable of the upper nibble and producing therefrom at an output terminal a fourth enabling conjunctive signal that represents a second error signal if the product of said second enabling conjunctive signal and the least significant variable of the upper nibble causes an enabling signal to appear at the output terminal of said fourth logic means, said fourth logic means producing a disabling output signal if the product of said second enabling conjunctive signal and the least significant position variable od the upper nibble causes a disabling signal at the output terminal of said fourth logic means;

(e) fifth logic means adapted to receive simultaneously at input terminals a most and a next-to-most significant position variable of the upper nibble and produce therefrom at an output terminal a fifth enabling conjunctive signal that represents a third error signal if the sum of said most and the next-to-most significant variables produces an enabling output of said fifth logic means, said fifth logic means producing a disabling output signal if the sum of the most and next-to-most significant variable of the upper nibble causes a disabling signal at the output terminal of said fifth logic means; and (f) buffer means adapted to receive a most significant variable of the lower nibble and produce therefrom at an output a fourth error signal if the most significant variable produces an enabling signal at the output terminal of said buffer means, said buffer means producing a disabling output signal if the variable of the lower nibble causes a disabling signal at said output terminal of said buffer means.

2. Apparatus in accordance with claim 1 wherein said first enabling conjunctive signal represents the product of the logic variables of the symbol for a FUEL, TEMP, OIL, VOLT, DIM. SPEED or RPM function; wherein said first chosen function symbol is the destination information provided in a lower nibble representing the symbol for a MAP function; wherein said second chosen function symbol is the destination information provided in a lower nibble representing the symbol for either the SPEED or the RPM function; wherein said next to least significant variable of said upper nibble is a DIRECTION signal for said MAP function while the least and the next-to-least significant variables of said upper nibble are a first and second DIRECTION signal for both said SPEED and RPM functions.

3. Apparatus in accordance with claim 2 wherein error detection algorithms formed by said first through fifth logic means of said apparatus changes in response to the symbol being processed; wherein if said apparatus is testing symbols for functions other than MAP, SPEED or RPM, then the most significant variable of said lower nibble and all the variable of said upper nibble are used for error detection; wherein if said apparatus is testing symbols for the MAP function, then the lower nibble most significant variable and all upper nibble variables except for the next-to-most significant variable are used for error detection; wherein if said apparatus is testing symbols for SPEED or RPM functions, then the most significant variable of said lower nibble and the most and next-to-most significant variables of said upper nibble are used for error detection.

* * * * *